United States Patent Office 3,734,882
Patented May 22, 1973

3,734,882
METHOD OF MAKING AN IMPROVED PROCESSABLE SILICONE RUBBER AND PRODUCT THEREOF
Thomas D. Talcott, Midland, Mich., assignor to Dow Corning Corporation, Midland, Mich.
No Drawing. Filed Aug. 17, 1971, Ser. No. 172,599
Int. Cl. C08g 51/04
U.S. Cl. 260—37 SB       23 Claims

ABSTRACT OF THE DISCLOSURE

Mixing a silicone rubber stock comprising an organosiloxane gum and a reinforcing silica filler with an organic titanate gives a silicone rubber stock with improved handling properties, increased flow resistance, improved processability and increased green strength.

---

This invention relates to a process for making silicone rubber with improved processing properties and to the silicone rubber stocks made by the process.

Silicone rubbers are well known in the art and their utility has been clearly established in the prior art. Silicone rubber stocks comprise a gum and a reinforcing filler which produces what is known as crepe hardening during storage. To avoid the crepe hardening, "anti-crepe agents" or "plasticizers" are added. The resulting silicone rubber stocks sometimes become tacky and the processing of them is difficult and inconvenient. The silicone rubber stocks can thus be prone to crepe hardening which is undesirable or they become tacky which also makes them undesirable to handle. Thus, a silicone rubber stock to be used in extrusion should not exhibit crepe hardening or tackiness since both properties hinder satisfactory extrusion. Also a stock should be controllable as to its flowability. It has now been found that by incorporating into the silicone rubber stock an organic titanate, the above problems can be overcome.

It is therefore an object of this invention to provide a process for improving the handling properties of a silicone rubber stock. It is also an object to provide a silicone rubber stock with improved handling properties. These and other objects will become more apparent from the following detailed description of the present invention.

This invention relates to a method for making silicone rubber stock comprising mixing an organopolysiloxane gum and a reinforcing silica filler, the improvement consisting essentially of mixing with the gum and filler an amount of an organic titanate sufficient to improve the handling properties of the silicone rubber stock.

A silicone rubber stock, for the purposes of the present invention, is any mixture of an organopolysiloxane gum and a reinforcing silica filler with or without other additives. The silicone rubber stocks of the present invention can include everything except a curing catalyst and the organic titanate. Silicone rubber stocks are well known in the art and are available commercially. For the most part, the silicone rubber stocks comprise a diorganopolysiloxane gum and a reinforcing silica filler. The diorganopolysiloxane gums are units of the formula $R_2SiO$ bonded together by silicon-oxygen-silicon bonds in which R is a monovalent hydrocarbon radical or a halogenated monovalent hydrocarbon radical.

R can be any monovalent hydrocarbon radical such as methyl, ethyl, propyl, isopropyl, butyl, pentyl, isopentyl, neopentyl, hexyl, octyl, dodecyl, octadecyl, 3-methylheptyl, 6-butyloctadecyl, tertiary butyl, myricyl and 2,2-diethylpentyl; alkenyl radicals such as, vinyl, allyl, hexenyl, butenyl, 3-octenyl, 4,9-octadecadienyl and 4-nonenyl; alkynyl radicals such as propynyl, heptynyl, butynyl, decynyl; alkenynyl radicals such as 1-penten-3-ynyl, 2-ethyl-1-buten-3-ynyl; cycloaliphatic radicals such as, cyclobutyl, cyclopentyl, cyclohexyl, cycloheptyl, propylcyclohexyl, 2,4-dimethylcyclopentyl, cyclohexenyl, bicyclo[3.1.0]hexyl, tricyclo[3.2.1.1$^{3,8}$]-5-nonenyl, spiro[4.5]decyl, dispiro[4.1.4.2]-1-tridecenyl, decahydronaphthyl, 2,3-dihydroindyl and 1,2,3,4-tetrahydronaphthyl; aryl radicals such as phenyl, tolyl, xylyl, 3-ethylphenyl, xenyl, naphthyl, anthracyl, pentacenyl, 3,4-methylethylphenyl, 9,9'-bifluoryl and 4-m-terphenyl; and aralkyl radicals such as 2-phenyl-octyl, 3-methyl-2-(4-isopropylphenyl)heptyl, benzyl, 2-ethyltolyl, 2-ethyl-p-cymyl, diphenylmethyl, 4,5-diphenylpentyl, 2-phenylethyl and 2-phenylpropyl.

R can be any monovalent halogenated hydrocarbon group such as aliphatic groups such as chloromethyl, 3-chloropropyl, 3,3,3-trichloropropyl, perfluorovinyl, chlorooctadecyl or radicals of the formula $R_1CH_2CH_2$—where $R_f$ can be any perfluoroalkyl group such as trifluoromethyl, perfluoroethyl, perfluoroisobutyl, perfluoroheptyl or perfluorooctadecyl; aromatic groups such as dichlorophenyl, tetrabromoxenyl, tetrachlorophenyl, alpha,alpha,alpha-trifluorotolyl or iodonaphthyl; cycloaliphatic groups such as chlorocyclohexyl, bromocyclopentyl or chlorocyclohexenyl and aralkyl groups such as chlorobenzyl, beta-(chlorophenyl)ethyl or beta-(iodophenyl)ethyl or beta-(bromophenyl)propyl.

Preferably, R is selected from methyl, vinyl, phenyl, ethyl and 3,3,3-trifluoropropyl radicals wherein at least 50 percent of the R radicals are methyl radicals. The diorganopolysiloxane gums can be endblocked with silicon-bonded hydroxyl radicals or triorganosiloxy radicals where the organic groups are the same as for R.

The silicone rubber stocks also contain a reinforcing silica filler. The reinforcing silica fillers are those conventionally used in silicone rubber such as fume silica, silica aerogel and silica xerogel. Other fillers can also be present such as silica soot, carbon black, quartz diatomaceous earth, metal carbonates such as calcium carbonate, metal oxides, such as alumina, metal silicates such as zirconium silicate, clays, talc and the like.

The silicone rubber stocks can also contain other ingredients conventionally used in silicone rubber, such as pigments to impart color, compression set additives, plasticizers, heat stability additives and the like.

The organic titanates can be any of the well known organic titanates such as those known as catalysts for room temperature vulcanizable silicone rubbers, as shown in U.S. Pat. No. 3,151,099, U.S. Pat. No. 3,294,739, U.S. Pat. No. 3,334,067 and U.S. Pat. No. 3,161,614. The organic titanates include both the titanate compounds such as the tetraalkyltitanates and the polymerized titanates such as the polymerized alkyltitanate of the tetraalkyltitanate. Illustrative examples of the organic titanates include tetraethyltitanate, tetraisopropyltitanate, tetra(2-ethylhexyl)titanate, tetrabutyltitanate, bis(acetylacetonyl)diisopropyltitanate, $[O=C(CH_3)CH=C(CH_3)-O-]_2Ti(OC_{18}H_{31})_2$, $[O=C(CH_2CH_3)C(CH_3)=C(CH_2CH_2CH=CH_2)-O-]_2Ti(OCH_3)_2$, $[O=C(CH_3)CH=C(CH_3)-O-]_2Ti(OH)_2$,

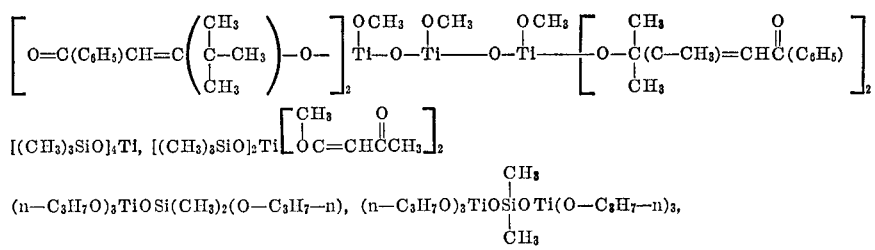

$$[O=C(C_6H_5)CH=C(\underset{\underset{CH_3}{|}}{\overset{\overset{CH_3}{|}}{C}}-CH_3)-O-]_2 [\overset{\overset{OCH_3}{|}}{Ti}-O-\overset{\overset{OCH_3}{|}}{Ti}-O-\overset{\overset{OCH_3}{|}}{Ti}-]-[O-\underset{\underset{CH_3}{|}}{\overset{\overset{CH_3}{|}}{C}}(C-CH_3)=CH\overset{O}{\overset{\|}{C}}(C_6H_5)]_2$$

$[(CH_3)_3SiO]_4Ti, \quad [(CH_3)_3SiO]_2Ti[\overset{\overset{CH_3}{|}}{O}C=CH\overset{O}{\overset{\|}{C}}CH_3]_2$ $(n-C_3H_7O)_3TiOSi(CH_3)_2(O-C_3H_7-n), \quad (n-C_3H_7O)_3TiO\underset{\underset{CH_3}{|}}{\overset{\overset{CH_3}{|}}{Si}}OTi(O-C_3H_7-n)_3,$ tetraoctadecyltitanate, tetraphenyltitanate, triethanolaminetitanate, tetrakis-triethanolaminetitanate-N-stearate, diisopropyldiacetoxytitanate, octyleneglycoltitanate and polymerized products thereof. Additional organic titanates can be found in the patents cited above. The preferred organic titanates are the tetraalkyltitanates and the polymerized alkyl titanate thereof.

In the method of making a silicone rubber stock, an organopolysiloxane gum and a reinforcing silica filler are mixed usually by milling on a rubber mill. Such methods of mixing gums and fillers are well known in the art. When such silicone rubber stocks are prepared, in accordance with this invention, a silicone rubber stock with improved handling properties is obtained if an organic titanate is added during the mixing of the gum and filler. Preferably, the organic titanate is added after the gum and filler have been at least partially mixed. However, the organic titanate can be added after the gum and filler have been thoroughly mixed. The amount of organic titanate is not narrowly critical in that the amount used will depend upon the nature of the organopolysiloxane gum used, the ratio of the gum to reinforcing silica filler and the type of handling improvement desired. The amount of organic titanate can be for most purposes from 0.05 to 5 parts by weight per 100 parts by weight of silicone rubber stock. However, more or less than this amount can be used. Amounts exceeding about 20 parts by weight per 100 parts by weight of silicone rubber stock however are not recommended. Most silicone rubber stocks show improved handling properties within the range of 0.5 to 2 parts by weight organic titanate per 100 parts by weight silicone rubber stock.

The silicone rubber stocks of this invention comprise an organopolysiloxane gum, a reinforcing silica filler and an organic titanate in an amount sufficient enough to provide an improved processable silicone rubber stock.

By the term "processable silicone rubber stock," it is to be understood that the silicone rubber stock can be used in any of the processes which may be required of a silicone rubber stock and show improvement in these processes. Improvements in processability can include, more readily milled stock after aging for example when a peroxide catalyst is added, does not oversoften when milled, can readily be extruded, does not change its dimensions drastically when extruded, has improved flow resistance, has increased green strength to allow handling of uncured fabricated articles, handling properties are more consistent and are controllable and/or have increased viscosity. Furthermore, crepe hardening is eliminated or reduced both upon aging the original stock or after the stock has been softened.

The improved processability properties of the silicone rubber stock can be shown by using a test apparatus called CEPAR apparatus where CEPAR refers to cure, extrusion plasticity, and recovery. This apparatus and its operation are described in an article by F. S. Conant and W. E. Claxton entitled "The CEPAR Apparatus: A Versatile Instrument For Measuring Processing Characteristics Of Rubber Mixes," Rubber World, November 1960. This article by Conant et al. is hereby incorporated by reference with respect to the apparatus, its operation and details on the values derived therefrom. In studying the processability of elastomers, the CEPAR apparatus is essentially an extrusion plastometer operating at a chosen constant relatively low load with provisions for heating the test sample and for measuring the loading arm deflection at any given time after applying or removing the active load. Basically, an extruding force is applied to a plunger which rests on top of the test sample which forces the sample material up through an orifice in the bottom of the plunger. A continued load application results in a continuous extrusion through the orifice at a nearly constant rate, the reciprocal of which is a measure of the flow resistance, $N_f$. The $N_f$ results will be used herein to show improved processability for the silicone rubber stocks. With a beam load of 10 pounds the $N_f$ value should be more than 5 to provide a good processable silicone rubber stock, since silicone rubber stocks below 5 usually are too soft for most processing requirements. An $N_f$ value greater than 1000 is usually considered to show a silicone rubber stock which is too hard for most processing requirements. However, the present invention is not limited by the particular $N_f$ value, since the softness or hardness of a silicone rubber stock is not limited to the $N_f$ values of 5 and 1000 since for some processes an $N_f$ value of 80 may be too soft. For the purpose of the present invention, an improvement is shown by increasing the $N_f$ value and also by having the $N_f$ value remain as constant as possible through aging and processing of a silicone rubber stock. Thus, an improved silicone rubber stock would be one which resulted in both or either of the above, with respect to $N_f$ values.

The amount of organic titanate can be present in an amount sufficient enough to provide for essentially constant $N_f$ value during aging. This amount can be less than the amount necessary to show an increase in the $N_f$ value, flow resistance.

The silicone rubber stocks of the present invention can be cured by any of the conventional vulcanization methods known in the art, especially through the organic peroxides used in vulcanizing silicone rubber stocks. Some illustrative examples of organic peroxides include, bis(2,4-dichlorobenzoyl)-peroxide, benzoyl peroxide, dicumyl peroxide, paradichlorobenzyl peroxide, tertiary butyl perbenzoate, 2,5 - bis(tertiarybutylperoxy)-2,5-dimethylhexane, and ditertiary butyl peroxide.

The amounts of ingredients usually found in silicone rubber stocks, based on 100 parts by weight organopolysiloxane gum are from 10 to 100 parts by weight reinforcing silica filler, preferably from 20 to 60 parts by weight and from 0.1 to 10 parts by weight organic peroxide, preferably from 0.4 to 5 parts by weight.

The improved method of this invention provides a silicone rubber stock with improved handling and processing properties. The use of an organic titanate during the mixing of the gum and filter provides a more readily millable stock, a stock which has improved handling properties upon remilling, a stock which has improved handling properties after softening upon aging, an improved extrudable stock and a stock which has increased green strength to allow easier handling of fabricated parts. The silicone rubber stocks of this invention are usable as silicone rubber in all the conventional applications and processes with the added advantage of the above stated improvements.

The following examples are for illustrative purposes only and should not be construed as limiting the present invention which is properly delineated in the claims.

EXAMPLE 1

The following silicone rubber stock was prepared by milling on a rubber mill:

100 parts by weight of a polydimethylsiloxane gum having a Williams plasticity of about 70 where about 80 percent of the gum molecules were endblocked with dimethylvinylsiloxy groups and about 20 percent of the gum molecules were endblocked with hydroxyl radicals,
30 parts by weight of a reinforcing fume silica filler,
3 parts by weight of a polydiorganosiloxane fluid having 22 mol percent methylvinylsiloxane units and 78 mol percent dimethylsiloxane units with dimethylvinylsiloxy endblocking,
10 parts by weight hexamethyldisilazane and
0.5 part by weight of water.

The above milled mixture was base heated for 3 hours at 150–200° C. and thereafter 3 parts by weight of a heat stability additive was milled into the silicone rubber stock.

The resulting silicone rubber stock was aged at room temperature for three weeks. Initially and at one week intervals of aging, samples of the silicone rubber stock were tested with the CEPAR apparatus and the $N_f$ flow resistance, value was determined. The $N_f$ value was also determined after softening the silicone rubber stock by milling after the three week aging period, after over softening the silicone rubber stock by milling an additional ten minutes, after one day aging at room temperature after over softening the silicone rubber and then after a one week's aging period.

The CEPAR apparatus is described by Conant et al. cited above and by U.S. Pat. No. 2,904,994. This apparatus is available commercially from the Firestone Tire and Rubber Co., Akron, Ohio. The CEPAR apparatus is designed to measure the resistance to flow under a variable applied load on the beam of 0 to 20 pounds. Each pound of beam load is equivalent to 5.33 p.s.i. load on the sample. Thus, the actual applied load on the sample ranges from 0 to 106.6 p.s.i. Since the CEPAR apparatus measures flow or flow resistance by extrusion through an orifice, it is a method which can be used to determine the handling properties of a silicone rubber stock such as for molding, milling, calendaring and extruding feeding technique.

The procedure used to determine the $N_f$ values was as follows. The extrusion cavity insert was removed from the heater-block and rinsed with toluene, scrubbed lightly with a cleaning brush, rinsed thoroughly with acetone and then blown dry with high pressure air. The equipment was then reassembled. A test sample of the silicone rubber stock after the designated conditioning was prepared by cutting a section about ⅝ inch to ¾ inch thick with a ¾ inch cork borer. For softened samples, the test sample was obtained from a two roll mill in sheets of about ⅜ inch thickness and then plied to make a sample thickness of ¾ inch by using a ¾ inch cork borer. The sample was removed from the cork borer with a push rod. The test sample of silicone rubber was then weighed to 3.8 times its specific gravity or to 4.5±0.01 grams for samples of unknown specific gravity. The $N_f$ values were determined for the silicone rubber stocks at room temperature and therefore the temperature control was not used.

The Bakelite slide at the bottom of the heater-block was moved to the load position, test position. The ⅞ inch solid Bakelite filler plug was inserted into the extrusion cavity, followed by the ¼ inch solid steel plug with the recessed edge down. The sample was then inserted into the extrusion cavity without touching the sides. An extrusion orifice plate with a ¼ inch orifice was placed on top of the sample and the load plunger was placed on top of the orifice plate and pushed down until there was a marked resistance to the movement of the load plunger. The cam wheel was then rotated to its highest position to hold the load beam up. The direct reading stylus was checked to make sure it was attached to the load beam. The load beam was then swung down until it contacted the load plunger. The beam weight was set at 13 until the load beam contacted the load cam. The recorder chart paper was adjusted to zero by adjusting the takeup roll and chart paper to the proper height. The power switch was turned on with the recorder chart speed set at 2.5 inches per minute. The load weight was pushed to position 1 and the recorder was turned on to the "without timer" position. The cam motor was turned to manual and rotated to its lowest position and then shut off. The beam load used was 10 pounds. Each applied load was run for at least 1.5 minute intervals. After the test was finished when the load beam stopped in the lowest cam position, the recorder was shut off.

The hanging weights were removed from the load beam, the load beam was pushed to position 1, and then swung up. The Bakelite slide was placed in the unload position and a solid push rod was used to push the load plunger down into a drawer. The load plunger, orifice plate, residual sample, steel plug and Bakelite plug were removed. The equipment was cleaned and the apparatus was readied for the next run.

Continued load application gave a nearly constant extrusion rate. The reciprocal of this rate was a measure of the flow resistance, $N_f$. When the load was removed, the material tended to retract through the orifice plate forcing it upward. This was a measure of hot recovery. For the silicone rubber stocks, this latter value was found to be consistently small in all cases and essentially meaningless. The $N_f$ value was calculated from the following equation:

$$N_f = \frac{20 \text{ (Chart Distance)}}{0.074 \text{ (Chart Speed) (Chart Deflection)}}$$

Where the Chart Distance was the length in inches on the horizontal axis over which the flow measurement was made, the Chart Speed was 2.5 inches per minute, the Chart Deflection was the number of chart units dropped on the vertical axis for the flow measurement range and 20 was a constant to convert the chart units to inches. The 0.074 was an instrument constant. $N_f$ was then expressed as minutes per inch.

The $N_f$ values for the silicone rubber stock of this example were as shown in Table I. The silicone rubber stock was run as prepared above and another stock was prepared with 1.5 parts by weight of tetraisopropyltitanate milled into the stock wherein the $N_f$ values were determined under the same conditions.

TABLE I

| Condition at testing | $N_f$ value, 0 part tetraisopropyl-titanate | $N_f$ value, 1.5 parts tetraisopropyl-titanate |
|---|---|---|
| Initially | 1.8 | >10,000 |
| After: | | |
| 1 week aging | 7.5 | >10,000 |
| 2 weeks aging | 18 | 900 |
| 3 weeks aging | 21 | 900 |
| Softening | 1.8 | 68 |
| Oversoftening | 0.8 | 170 |
| One day aging after oversoftening | 2.4 | 900 |
| One week aging after oversoftening | 15 | 450 |

From Table I, the $N_f$ values showed that upon aging the silicone rubber stock containing the tetraisopropyltitanate did not exhibit crepe hardening and after 2 weeks was essentially stable. The silicone rubber stock without the titanate showed crepe hardening with the $N_f$ value increasing more than 11 times in three weeks. Upon softening, both samples soften, as shown by the lower $N_f$ values, however, whereas the silicone rubber stock containing the tetraisopropyltitanate shows more than twice the $N_f$ value on additional milling, the silicone rubber stock without the titanate continues to soften as shown by the lower $N_f$ value which drops below 1.0. Values of $N_f$ below 1.0 would be materials which are extremely soft and difficult to mill. Since a user of the silicone rubber stock may well add the peroxide vulcanizing agent and pigments, which require additional milling for mixing purposes, the continual softening of a silicone rubber stock upon milling is clearly a disadvantage, especially where the $N_f$ value drops below 1.0. Where low $N_f$ values are observed, the silicone rubber stocks exhibit porosity on vulcanization. After oversoftening, the $N_f$ value of the silicone rubber stock containing the titanate rapidly returns to its original value whereas the silicone rubber stock without the titanate begins crepe hardening as shown by the rate of increase in $N_f$ value more rapid than before softening. The titanate containing silicone rubber stock, on the other hand, does not show crepe aging after softening and in fact, shows a decrease in $N_f$ value after one week's aging. The higher $N_f$ values at all stages show that the silicone rubber stock with the titanate has a much higher green strength than the silicone rubber stock without the titanate.

The silicone rubber stock with the titanate can be extruded without extreme extrusion swell as indicated by its higher green strength, does not oversoften or crepe harden.

EXAMPLE 2

The following silicone rubber stocks were prepared by milling the ingredients and then tested on the CEPAR apparatus by measuring the $N_f$ value under the conditions described in Example 1.

(A)

100 parts by weight of a polydimethylsiloxane gum having a Williams plasticity of about 60 where about 30 percent of the gum was endblocked with hydroxyl radicals and 70 percent was endblocked with dimethylvinylsiloxy units and the gum contains about 0.1 mol percent methylvinylsiloxane units.
22 parts by weight of a reinforcing fume silica filler,
5.5 parts by weight of a hydroxyl endblocked polymethylphenylsiloxane fluid having about 4.5 weight percent silicon-bonded hydroxyl radicals, and
1.0 parts by weight of a hydroxyl endblocked polydimethylsiloxane fluid having about 4.0 weight percent silicon-bonded hydroxyl radicals.

(B)

Same as (A) above with 1.5 parts tetraisopropyltitanate added.

(C)

100 parts by weight of a dimethylvinylysiloxy endblocked polydimethylsiloxane gum having a Williams plasticity of about 60 and having 0.142 mol percent methylvinylsiloxane units,
25 parts by weight of a reinforcing fume silica filler, and
10 parts by weight of a hydroxyl endblocked polydimethylsiloxane fluid having about 4.0 weight percent silicon-bonded hydroxyl radicals.

(D)

Same as (C) above with 1.5 parts by weight tetraisopropyltitanate added.

(E)

100 parts by weight of a dimethylvinylsiloxy endblocked polydimethylsiloxane gum having a Williams plasticity of about 60 and having about 0.29 mol percent methylvinylsiloxane units,
50 parts by weight of a reinforcing fume silica filler,
11.5 parts by weight of a hydroxyl endblocked polydimethylsiloxane fluid having about 4.0 weight percent silicon-bonded hydroxyl radicals,
1 part by weight of a hydroxyl endblocked polymethylvinylsiloxane fluid having about 4.5 weight percent silicon-bonded hydroxyl radicals,
3 parts by weight of a heat stability additive, and
85 parts by weight of 5 micron quartz.

(F)

Same as (E) above with 1.5 parts by weight tetraisopropyltitanate added.

(G)

100 parts by weight of a dimethylvinylsiloxy endblocked polydimethylsiloxane gum having a Williams plasticity of about 60 and having about 0.17 mol percent methylvinylsiloxane units,
23.6 parts by weight of reinforcing fume silica,
2.3 parts by weight of the polydimethylsiloxane fluid as defined in (E) above,
4.56 parts by weight of the polymethylphenylsiloxane fluid as defined in (A) above,
0.6 part by weight of the polymethylvinylsiloxane fluid as defined in (E) above,
3 parts by weight of a heat stability additive, and
81 parts by weight of 5 micron quartz.

(H)

Same as (I) below with 1.5 parts by weight tetraisopropyltitanate added.

(I)

100 parts by weight of a dimethylvinylsiloxy endblocked polydimethylsiloxane gum having a Williams plasticity of about 60 and having about 0.21 mol percent methylvinylsiloxane units,
33.5 parts by weight reinforcing fume silica filler,
5.75 parts by weight of the polydimethylsiloxane fluid as defined in (E) above,
2.85 parts by weight of the polymethylphenylsiloxane fluid as defined in (A) above,
0.75 part by weight of the polymethylvinylsiloxane fluid as defined in (E) above,
3 parts by weight of a heat stability additive, and
88 parts by weight of 5 micron quartz.

(J)

Same as (I) above with 1.5 parts by weight tetraisopropyltitanate added.

(K)

100 parts by weight of a hydroxyl endblocked polymethyl-3,3,3-trifluoropropylsiloxane gum having a Williams plasticity of about 100 and having 0.596 mol percent methylvinylsiloxane units,
28 parts by weight of reinforcing silica filler,
7.8 parts by weight of the polydimethylsiloxane fluid as defined in (E) above, and
2.08 parts by weight of a heat stability additive.

(L)

Same as (K) above with 1.5 parts by weight tetraisopropyltitanate added.

The $N_f$ values were as shown in Table II.

TABLE II

| Condition at testing | $N_f$ value for— | | | | | | | | | | | |
|---|---|---|---|---|---|---|---|---|---|---|---|---|
| | (A) | (B) | (C) | (D) | (E) | (F) | (G) | (H) | (I) | (J) | (K) | (L) |
| Initially | 0.7 | 670 | 0.5 | 1.1 | 30.5 | 10,000 | 0.9 | 16.3 | 3.8 | 670 | 6.2 | 540 |
| After— | | | | | | | | | | | | |
| 1 week aging | 0.7 | 58 | 0.4 | 1.1 | 195 | 10,000 | 0.8 | 5.8 | 7.0 | 450 | 38 | 540 |
| 2 weeks aging | 0.7 | 37.5 | 0.4 | 1.6 | 340 | 10,000 | 0.7 | 5.3 | 8.5 | 370 | 1,320 | 900 |
| 3 weeks aging | 0.5 | 27 | 0.5 | 1.7 | 34 | 1,380 | 0.4 | 4.5 | 10.9 | 300 | 450 | 1,350 |
| Softening | 0.4 | 6 | 0.4 | 1.5 | 21 | 540 | 0.5 | 1.7 | 2.6 | 40.5 | 32 | 140 |
| Over softening | 0.4 | 32 | 0.4 | 1.9 | 8.2 | 420 | 0.4 | 3.9 | 1.3 | 98 | 13 | 79 |
| One day aging after over softening | 0.5 | 25.5 | 0.5 | 1.5 | 29 | 540 | 0.5 | 5.2 | 3.2 | | 90 | 450 |
| One week aging after over softening | 0.7 | 16.5 | 0.5 | 1.5 | 180 | 540 | 0.5 | 4.1 | 8.2 | 140 | 245 | 390 |

All the silicone rubber stocks containing titanate shown above exhibit improved handling over the same silicone rubber stock without titanate. The $N_f$ values show that each stock has increased green strength when titanate is present. The rate of crepe hardening was reduced or crepe hardening was eliminated in the silicone rubber stocks with titanate. The silicone rubber stocks with the titanate did not over soften or the amount of softening was reduced. Crepe hardening after softening in stocks containing titanates was essentially eliminated. The amount of increased flow resistance in stock (D) compared to stock (C) was important to handling even though 1.5 parts titanate did not cause a marked increase in $N_f$ value.

EXAMPLE 3

The titanate level was varied from 0 to 1.5 parts by weight in silicone rubber stocks as described in (A) and (E) of Example 2. The lots of polydimethylsiloxane gum and silica filler differed from those of (A) and (E). The $N_f$ values were determined after one week's aging as described in Example 1 and the results were as shown in Table III.

TABLE III

| Parts by weight tetraisopropyltitanate added to stock | $N^1$ value | |
|---|---|---|
| | Stock (A) | Stock (E) |
| 0.0 | 20.3 | 0.6 |
| 0.5 | 675 | 11.3 |
| 1.0 | 675 | 82 |
| 1.5 | 1,350 | 451 |

EXAMPLE 4

A silicone rubber stock was prepared by milling 100 parts by weight of the polydimethylsiloxane gum defined in Example 2(C), 17 parts by weight of reinforcing fume silica filler, 5.7 parts by weight of the polymethylphenylsiloxane fluid as described in Example 2(A) and 0.5 part by weight of the polymethylvinylsiloxane fluid as defined in Example 2(E). Three silicone rubber stocks were prepared by adding 0, 1.0 and 2.0 parts by weight tetraisopropyltitanate to the above silicone rubber stock. The $N_f$ values were determined as defined in Example 1, except a 5 pound beam load was used. The $N_f$ values were as shown in Table IV.

TABLE IV

| Condition at testing | $N_f$ value | | |
|---|---|---|---|
| | 0 part titanate | 1.0 part titanate | 2.0 parts titanate |
| Initially | 3 | 7 | 50 |
| After— | | | |
| 2 weeks aging | 2 | 5 | 18 |
| 3 weeks aging | 2 | 5 | 13 |
| Softening | 2 | 4 | 10 |
| Oversoftening | 2 | 6 | 25 |
| One day aging after oversoftening | 2 | 7 | 27 |
| One week aging after oversoftening | 2 | 4.5 | 15 |

Examples 3 and 4 show that the amount of increase in the $N_f$ value can be controlled by the amount of titanate used.

That which is claimed is:

1. In a method for making silicone rubber stock comprising mixing an organopolysiloxane gum and a reinforcing silica filler, the improvement consisting essentially of mixing with the gum and filler, an amount of an organic titanate sufficient to improve the processability of the silicone rubber stock and not exceeding 20 parts by weight organic titanate per 100 parts by weight of the silicone rubber stock, said organic titanate being selected from the group consisting of tetraalkyltitanates of the formula Ti(OR")$_4$ in which R" is a hydrocarbon radical selected from the group consisting of alkyl radicals containing at most 18 carbon atoms and cycloaliphatic radicals, a titanium compound having radicals attached to the titanium atom at laest one of said radicals being an organosiloxy radical wherein each silicon-bonded organic radical is a monovalent radical selected from the group consisting of hydrocarbon radicals and halohydrocarbon radicals, said organosiloxy radicals being attached to the titanium atom through Ti-O-Si linkages and any remaining valences of the Ti are satisfied by substituents selected from the group consisting of organic radicals which are attached to the titanium atom through Ti-O-C linkages, —OH and —O— of a Ti-O-Ti linkage, a beta-dicarbonyl titanium compound having a formula

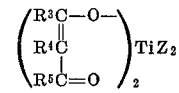

in which $R^3$ is a monovalent hydrocarbon radical having from 1 to 18 inclusive carbon atoms, $R^4$ is a monovalent radical selected from the group consisting of hydrocarbon radicals having from 1 to 18 inclusive carbon atoms and hydrogen atoms, $R^5$ is a monovalent radical selected from the group consisting of hydrocarbon radicals and aliphatic hydrocarbonoxy radicals, each having from 1 to 18 inclusive carbon atoms and Z is a radical selected from the group consisting of monovalent aliphatic hydrocarbonoxy radicals and monovalent acyloxy radicals, each having from 1 to 18 inclusive carbon atoms, hydroxyl radicals and divalent oxygen atoms forming a TiOTi linkage, tetraphenyltitanate, triethanolaminetitanate, octyleneglycoltitanate, tetrakis - triethanolaminetitanate-N-stearate and diisopropyldiacetoxytitanate, and polymerized products thereof.

2. In a method for making silicone rubber stock comprising mixing an organopolysiloxane gum and a reinforcing silica filler, the improvement consisting essentially of mixing with the gum and filler, an amount of an organic titanate sufficient to increase the flow resistance of the silicone rubber stock and not exceeding 20 parts by weight organic titanate per 100 parts by weight of the silicone rubber stock, said organic titanate being selected from the group consisting of tetraalkyltitanates of the formula Ti(OR")$_4$ in which R" is a hydrocarbon radical selected from the group consisting of alkyl radicals containing at most 18 carbon atoms and cycloaliphatic radicals, a titanium compound having radicals attached to the titanium atom at least one of said radicals being an organosiloxy radical wherein each silicon-bonded organic radical is a monovalent radical selected from the group consisting of hydrocarbon radicals and halohydrocarbon radicals, said organosiloxy radicals being attached to the titanium atom through Ti-O-Si linkages and any remaining valences of the Ti are satisfied by substituents selected from the group consisting of organic radicals which are attached to the titanium atom through Ti-O-C linkages, —OH and —O— of a Ti-O-Ti linkage, a beta-dicarbonyl titanium compound having a formula

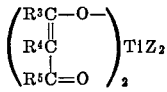

in which $R^3$ is a monovalent hydrocarbon radical having from 1 to 18 inclusive carbon atoms, $R^4$ is a monovalent radical selected from the group consisting of hydrocarbon radicals having from 1 to 18 inclusive carbon atoms and hydrogen atoms, $R^5$ is a monovalent radical selected from the group consisting of hydrocarbon radicals and aliphatic hydrocarbonoxy radicals, each having from 1 to 18 inclusive carbon atoms and Z is a radical selected from the group consisting of monovalent aliphatic hydrocarbonoxy radicals and monovalent acyloxy radicals, each having from 1 to 18 inclusive carbon atoms, hydroxyl radicals and divalent oxygen atoms forming a TiOTi linkage, tetraphenyltitanate, triethanolaminetitanate, octyleneglycoltitanate, tetrakis-triethanolaminetitanate-N-stearate and diisopropyldiacetoxytitanate, and polymerized products thereof.

3. The method in accordance with claim 1 in which the organic titanate is selected from the group consisting of tetraalkyltitanate and polymerized alkyl titanate thereof.

4. The method in accordance with claim 2 in which the organic titanate is selected from the group consisting of tetraalkyltitanate and polymerized alkyl titanate thereof.

5. The method in accordance with claim 3 in which the organic titanate is present in an amount of from 0.05 to 5 parts by weight based on 100 parts by weight of the silicone rubber stock.

6. The method in accordance with claim 5 in which the organic titanate is present in an amount of from 0.5 to 2 parts by weight based on 100 parts by weight of the silicone rubber stock.

7. The method in accordance with claim 4 in which the organic titanate is present in an amount of from 0.05 to 5 parts by weight based on 100 parts by weight of the silicone rubber stock.

8. The method in accordance with claim 7 in which the organic titanate is present in an amount of from 0.5 to 2 parts by weight based on 100 parts by weight of the silicone rubber stock.

9. The method in accordance with claim 6 in which the organic titanate is tetraisopropyltitanate.

10. The method in accordance with claim 8 in which the organic titanate is tetraisopropyltitanate.

11. The method in accordance with claim 6 in which the organic titanate is polymerized butyltitanate.

12. The method in accordance with claim 8 in which the organic titanate is polymerized butyltitanate.

13. A silicon rubber stock comprising an organopolysiloxane gum, a reinforcing silica filler and an organic titanate in an amount sufficient to provide an improved processable silicone rubber stock, said amount of organic titanate not exceeding 20 parts by weight per 100 parts by weight of a silicone rubber stock comprising an organopolysiloxane gum and a reinforcing silica filler, said organic titanate being selected from the group consisting of tetraalkyltitanates of the formula $Ti(OR'')_4$ in which R'' is a hydrocarbon radical selected from the group consisting of alkyl radicals containing at most 18 carbon atoms and cycloaliphatic radicals, a titanium compound having radicals attached to the titanium atom at least one of said radicals being an organosiloxy radical wherein each silicon-bonded organic radical is a monovalent radical selected from the group consisting of hydrocarbon radicals and halohydrocarbon radicals, said organosiloxy radicals being attached to the titanium atom through Ti-O-Si linkages and any remaining valences of the Ti are satisfied by substituents selected from the group consisting of organic radicals which are attached to the titanium atom through Ti-O-C linkages, —OH and —O— of a Ti-O-Ti linkage, a beta-dicarbonyl titanium compound having a formula

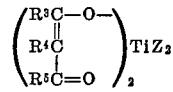

in which $R^3$ is a monovalent hydrocarbon radical having from 1 to 18 inclusive carbon atoms, $R_4$ is a monovalent radical selected from the group consisting of hydrocarbon radicals having from 1 to 18 inclusive carbon atoms and hydrogen atoms, $R^5$ is a monovalent radical selected from the group consisting of hydrocarbon radicals and aliphatic hydrocarbonoxy radicals, each having from 1 to 18 inclusive carbon atoms and Z is a radical selected from the group consisting of monovalent aliphatic hydrocarbonoxy radicals and monovalent acyloxy radicals, each having from 1 to 18 inclusive carbon atoms, hydroxyl radicals and divalent oxygen atoms forming a TiOTi linkage, tetraphenyltitanate, triethanolaminetitanate, octyleneglycoltitanate, tetrakis-triethanolaminetitanate - N-stearate and diisopropyldiacetoxytitanate, and polymerized products thereof.

14. A silicone rubber stock comprising an organopolysiloxane gum, a reinforcing silica filler and an organic titanate in an amount sufficient to provide a silicone rubber stock with increased flow resistance, said amount of organic titanate not exceeding 20 parts by weight per 100 parts by weight of a silicone rubber stock comprising an organopolysiloxane gum and a reinforcing silica filler, said organic titanate being selected from the group consisting of tetraalkyltitanates of the formula $Ti(OR'')_4$ in which R'' is a hydrocarbon radical selected from the group consisting of alkyl radicals containing at most 18 carbon atoms and cycloaliphatic radicals, a titanium compound having radicals attached to the titanium atom at least one of said radicals being an organosiloxy radical wherein each silicon-bonded organic radical is a monovalent radical selected from the group consisting of hydrocarbon radicals and halohydrocarbon radicals, said organosiloxy radicals being attached to the titanium atom through Ti-O-Si linkages and any remaining valences of the Ti are satisfied by substituents selected from the group consisting of organic radicals which are attached to the titanium atom through Ti-O-C linkages, —OH and —O— of a Ti-O-Ti linkage, a beta-dicarbonyl titanium compound having a formula

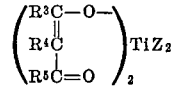

in which $R^3$ is a monovalent hydrocarbon radical having from 1 to 18 inclusive carbon atoms, $R^4$ is a monovalent radical selected from the group consisting of hydrocarbon radicals having from 1 to 18 inclusive carbon atoms and hydrogen atoms, $R^5$ is a monovalent radical selected from the group consisting of hydrocarbon radicals and aliphatic hydrocarbonoxy radicals, each having from 1 to 18 inclusive carbon atoms and Z is a radical selected from the group consisting of monovalent aliphatic hydrocarbonoxy radicals and monovalent acyloxy radicals, each having from 1 to 18 inclusive carbon atoms, hydroxyl radicals and divalent oxygen atoms forming a TiOTi linkage, tetraphenyltitanate, triethanolaminetitanate, octyleneglycoltitanate, tetrakis-triethanolaminetitanate - N-stearate and diisopropyldiacetoxytitanate, and polymerized products thereof.

15. A silicone rubber stock comprising 100 parts by weight of a mixture of an organopolysiloxane gum and a reinforcing silica filler and from 0.05 to 5 parts by weight of an organic titanate selected from the group consisting of tetraalkyltitanates of the formula Ti(OR")$_4$ in which R" is a hydrocarbon radical selected from the group consisting of alkyl radicals containing at most 18 carbon atoms and cycloaliphatic radicals, a titanium compound having radicals attached to the titanium atom at least one of said radicals being an organosiloxy radical wherein each silicon-bonded organic radical is a monovalent radical selected from the group consisting of hydrocarbon radicals and halohydrocarbon radicals, said organosiloxy radicals being attached to the titanium atom through Ti-O-Si linkages and any remaining valences of the Ti are satisfied by substituents selected from the group consisting of organic radicals which are attached to the titanium atom through Ti-O-C linkages, —OH and —O— of a Ti-O-Ti linkage, a beta-dicarbonyl titanium compound having a formula

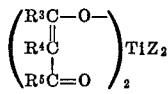

in which R$^3$ is a monovalent hydrocarbon radical having from 1 to 18 inclusive carbon atoms, R$^4$ is a monovalent radical selected from the group consisting of hydrocarbon radicals having from 1 to 18 inclusive carbon atoms and hydrogen atoms, R$^5$ is a monovalent radical selected from the group consisting of hydrocarbon radicals and aliphatic hydrocarbonoxy radicals, each having from 1 to 18 inclusive carbon atoms and Z is a radical selected from the group consisting of monovalent aliphatic hydrocarbonoxy radicals and monovalent acyloxy radicals, each having from 1 to 18 inclusive carbon atoms, hydroxyl radicals and divalent oxygen atoms forming a TiOTi linkage, tetrapheryititanate, triethanolaminetitanate, octyleneglycoltitanate, tetrakis-triethanolaminetitanate - N-stearate and diisopropyldiacetoxytitanate, and polymerized products thereof.

16. The silicone rubber stock according to claim 15 wherein the organic titanate is present in an amount of from 0.5 to 2 parts by weight.

17. The silicone rubber stock according to claim 15 wherein the organic titanate is selected from the group consisting of tetraalkyltitanates and polymerized alkyltitanates thereof.

18. The silicone rubber stock according to claim 17 wherein the organic titanate is a tetraalkyltitanate.

19. The silicone rubber stock according to claim 18 wherein the tetraalkyltitanate is tetraisopropyltitanate.

20. The silicone rubber stock according to claim 17 wherein the organic titanate is a polymerized butyltitanate.

21. The silicone rubber stock according to claim 15 wherein an organic peroxide vulcanizing agent is also present.

22. The silicone rubber stock according to claim 17 wherein an organic peroxide vulcanizing agent is also present.

23. A silicone rubber stock comprising a mixture of an organopolysiloxane gum, a reinforcing silica filler and an amount of organic titanate sufficient to provide a silicone rubber stock with an increased green strength, said amount of organic titanate not exceeding 20 parts by weight per 100 parts by weight of a silicone rubber stock comprising an organopolysiloxane gum and a reinforcing silica filler, said organic titanate being selected from the group consisting of tetraalkyltitanates of the formula Ti(OR")$_4$ in which R" is a hydrocarbon radical selected from the group consisting of alkyl radicals containing at most 18 carbon atoms and cycloaliphatic radicals, a titanium compound having radicals attached to the titanium atom at least one of said radicals being an organosiloxy radical wherein each silicon-bonded organic radical is a monovalent radical selected from the group consisting of hydrocarbon radicals and halohydrocarbon radicals, said organosiloxy radicals being attached to the titanium atom through Ti-O-Si linkages and any remaining valences of the Ti are satisfied by substituents selected from the group consisting of organic radicals which are attached to the titanium atom through Ti-O-C linkages, —OH and —O— of a Ti-O-Ti linkage, a beta-dicarbonyl titanium compound having a formula

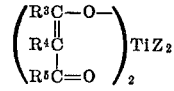

in which R$^3$ is a monovalent hydrocarbon radical having from 1 to 18 inclusive carbon atoms, R$^4$ is a monovalent radical selected from the group consisting of hydrocarbon radicals having from 1 to 18 inclusive carbon atoms and hydrogen atoms, R$^5$ is a monovalent radical selected from the group consisting of hydrocarbon radicals and aliphatic hydrocarbonoxy radicals, each having from 1 to 18 inclusive carbon atoms and Z is a radical selected from the group consisting of monovalent aliphatic hydrocarbonoxy radicals and monovalent acyloxy radicals, each having from 1 to 18 inclusive carbon atoms, hydroxyl radicals and divalent oxygen atoms forming a TiOTi linkage, tetraphenyltitanate, triethanolaminetitanate, octyleneglycoltitanate, tetrakis-triethanolaminetitanate - N-stearate and diisopropyldiacetoxytitanate, and polymerized products thereof.

References Cited

UNITED STATES PATENTS

| | | | |
|---|---|---|---|
| 2,736,721 | 2/1956 | Dexter | 260—37 SB X |
| 3,151,099 | 9/1964 | Ceyzeriat et al. | 260—37 SB X |
| 3,409,573 | 11/1968 | Guinet et al. | 260—37 SB X |
| 3,544,506 | 12/1970 | Dowd | 260—37 SB |

LEWIS T. JACOBS, Primary Examiner

U.S. Cl. X.R.

260—46.5 G